May 10, 1966  C. ORT ETAL  3,250,196
PHOTOGRAPHIC CAMERA
Filed Feb. 3, 1964
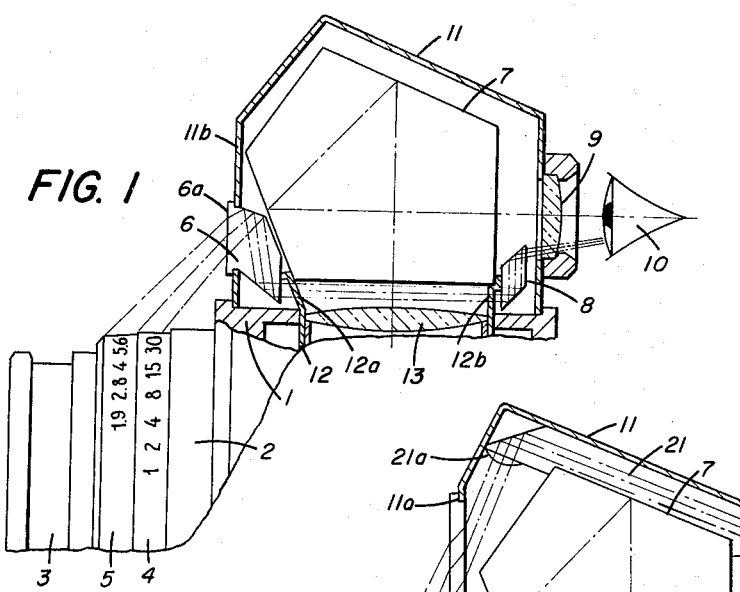
FIG. 1
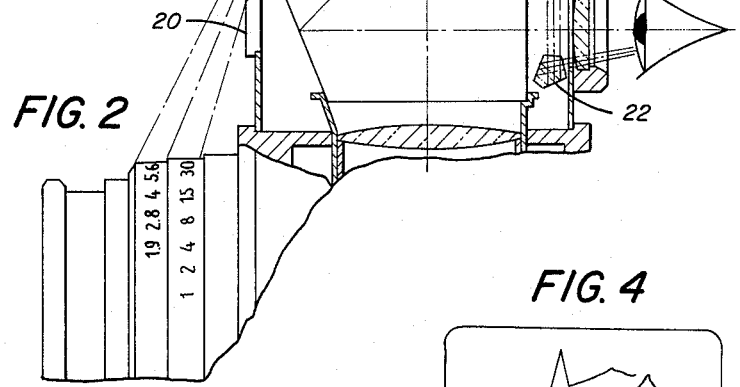
FIG. 2
FIG. 3
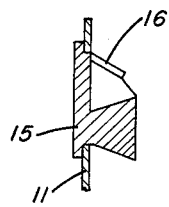
FIG. 4
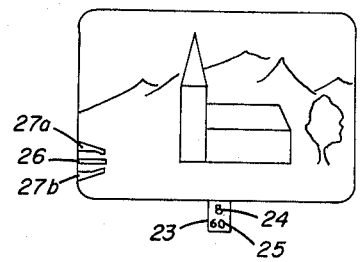
CARL ORT
ALFRED KILGUS
INVENTORS
BY R. Frank Smith
ATTORNEYS 3,250,196
PHOTOGRAPHIC CAMERA
Carl Ort, Stuttgart-Bad Cannstatt, and Alfred Kilgus, Stuttgart-Wangen, Germany, assignors to Eastman Kodak Company, Rochester, N.Y., a corporation of New Jersey
Filed Feb. 3, 1964, Ser. No. 341,911
Claims priority, application Germany, Feb. 2, 1963, K 48,847
2 Claims. (Cl. 95—44)

The present invention relates to camera viewfinders. More particularly this invention relates to an optical means for viewing the shutter, aperture and distance settings of a camera while looking into the viewfinder. The invention is particularly useful with reflex type cameras in which the viewfinder includes a pentaprism mounted in the top of the camera.

It is common in connection with exposure control, especially of the matching pointer type, to project or insert a view of the exposure meter pointer and matching pointer into the viewfinder. In a modern camera with a rangefinder, this allows handling of the rangefinding and exposure control while looking through the viewfinder. It is relatively easy to provide for viewing the exposure meter since one is free to place the pointer at any convenient location on the camera. However, it is also advantageous to know the specific aperture, shutter speed and/or distance setting for purposes of estimating depth of field, ability to stop motion, etc. To this end, several optical arrangements have been proposed which project into the viewfinder an image of the shutter, aperture and distance settings on the front of the camera; see U.S. Patent 3,094,911 and French Patent 1,240,877. In each case the problem solved involves the fact that the camera setting scales are (for known reasons) located around the lens barrel of the camera.

These prior systems involve attaching a reflecting prism to the main pentaprism of the reflex viewfinder and projecting the light from the scale into the path of the viewfinder light, through the interface between the two prisms.

The present invention involves using a series of reflectors to direct the light around the main pentaprism to the eyepiece rather than through it. It has the advantage of eliminating the necessity of an interface with the viewfinder pentaprism, thus eliminating the necessity for the accurate cementing and grinding or molding necessary with any optical interface. High quality results at relatively low cost are obtained when the two systems are left independent and yet the present system is just as easy to use as the prior one.

Another attribute of the present invention is that its elements are placed in a section of the housing for the pentaprism that is ordinarily enclosed, unused space. It contains no parts which protrude from the top or front of the camera. Such protruding parts are likely to be damaged and may affect the overall appearance of the camera.

Other advantages of the present invention will appear from the following description when read in connection with the accompanying drawing in which:

FIG. 1 is a partial cross section of the preferred embodiment of the invention as viewed from the side in which the ray path depicting the setting values is directed around the base of a viewfinder pentaprism.

FIG. 2 shows a side view of an embodiment of the invention in which the ray path is directed around the top of the pentaprism by means of a prism bar.

FIG. 3 shows an alternative prism designed for substitution in the preferred embodiment shown in FIG. 1.

FIG. 4 shows a viewfinder image as seen by the observer, showing exposure setting values and an exposure meter indication.

Referring to FIG. 1, a shutter 2 and a lens 3 are mounted in the front of a housing 1 of a single lens mirror reflex camera. Values given on a shutter speed setting ring 4 and an aperture setting ring 5 are reflected through a window 6a in the front 11b of a housing 11 for a viewfinder pentaprism 7. They are thence reflected twice in a prism 6 while being directed around the base of the viewfinder pentaprism 7 to a prism 8 which reflects them through an eyepiece 9 to the eye 10 of an observer. It is within the scope of the invention to replace prisms 6 and 8 by a corresponding number of mirrors. The prisms 6 and 8 are connected to the housing 11 of the viewfinder and/or the lens housing 1 and/or a holder 12 for the pentaprism 1 or a viewfinder lens 13. The holder 12 is provided with openings 12a and 12b limiting the ray path between the prisms 6 and 8.

According to FIG. 3 the doubly reflecting prism 6 may be replaced by a single reflecting prism 15 and a mirror 16, each of which is held by the viewfinder housing.

The embodiment according to FIG. 2 differs from the one first described in that the ray path for the image of the scale values is directed above the viewfinder pentaprism. On the front of the viewfinder housing 11 a glass or plastic plate 20 is fixed in an opening 11a. A prism bar 21 is arranged above the viewfinder pentaprism 7. A pentaprism 22 is substituted for prism 8 to receive light from the prism bar 21 and direct it through the eyepiece 9 to the eye.

A surface 21a of the prism 21 may have either positive or negative refractive power. It is within the scope of the invention that one or several surfaces of prisms 6, 8, 15 and 21 have a positive or negative refraction power.

The viewfinder image according to FIG. 4 shows in an area 23 scale readings 24 and 25. The viewfinder image may also show an exposure meter pointer 26 situated between two exposure marks 27a and 27b.

The invention has been described in detail with particular reference to preferred embodiments thereof, but it will be understood that variations and modifications can be effected within the spirit and scope of the invention as described hereinabove and as defined in the appended claims.

We claim:
1. In a single lens reflex photographic camera of the type having
    (A) a picture-taking optical system;
    (B) a lens barrel located at the front of the camera which barrel has scale markings thereon indicating the adjustment of one of the shutter, aperture and distance settings of the camera;
    (C) an eyepiece located at the rear of the camera;
    (D) a pentaprism for receiving light images that have been directed upward from said picture taking optical system, for inverting them and for directing them into said eyepiece;
    (E) a housing for housing said pentaprism and holding said eyepiece in the rear thereof, which housing has a window in a front section thereof, said window positioned to receive light from said scale markings; and,
    (F) a system of reflectors located in said housing for directing into said eyepiece light received through said window from said scale markings; the improvement streamlining said pentaprism housing wherein
        (1) said window is located in a plane perpendicular to the optical axis of said camera;
        (2) said system of reflectors is positioned so that it directs light from said scale markings around said pentaprism to said eyepiece; and,

(3) a major portion of each of the reflecting surfaces of said system of reflectors is located behind the forward-most edge of said pentaprism.

2. The improvement according to claim 1 wherein said reflecting system is made up of four reflecting surfaces, the first three of which taken in the direction the light passes are completely below the forward-most edge of the pentaprism, whereby said reflecting surfaces are positioned in otherwise unused spaced between the housing and the pentaprism.

References Cited by the Examiner

UNITED STATES PATENTS 3,174,416  3/1965  Heerklotz _____ 95—44

FOREIGN PATENTS 936,964  9/1962  Great Britain.
361,976  6/1962  Switzerland.

JOHN M. HORAN, *Primary Examiner.*